United States Patent
Illinger

[15] 3,691,667
[45] Sept. 19, 1972

[54] FOLDABLE MINNOW TRAP

[72] Inventor: Francis D. Illinger, 527 E. Mich. St., Orlando, Fla. 32806

[22] Filed: Oct. 30, 1970

[21] Appl. No.: 85,454

[52] U.S. Cl. ................................43/65, 43/100
[51] Int. Cl. ....................A01k 69/06, A01m 23/08
[58] Field of Search..........43/100, 102, 103, 105, 65, 43/55, 56

[56] References Cited

UNITED STATES PATENTS

| | | | |
|---|---|---|---|
| 3,145,500 | 8/1964 | French et al.................. | 43/103 |
| 3,003,278 | 10/1961 | Armentrout.................. | 43/103 |
| 3,245,173 | 4/1966 | Sylvester ....................... | 43/65 |
| 3,497,989 | 3/1970 | Schultz......................... | 43/100 |

*Primary Examiner*—Warner H. Camp
*Attorney*—Roger L. Martin

[57] ABSTRACT

A collapsible minnow trap featuring compactness in storage and simplicity in manufacture is made from a flexible sheet of resilient material that is precut, folded and heat sealed along its edge portions to provide a two layer flat, preferably rectangular, structure with apertured corners. The structure is manipulatable by the fisherman into a self-sustaining creased operational minnow trap structure in which the chamber of the trap is wholly defined by the flexible sheet and in which the corners are tucked inwardly to provide inlets to the chamber.

2 Claims, 6 Drawing Figures

FRANCIS D. ILLINGER
INVENTOR

By Roger L. Martin

Attorney

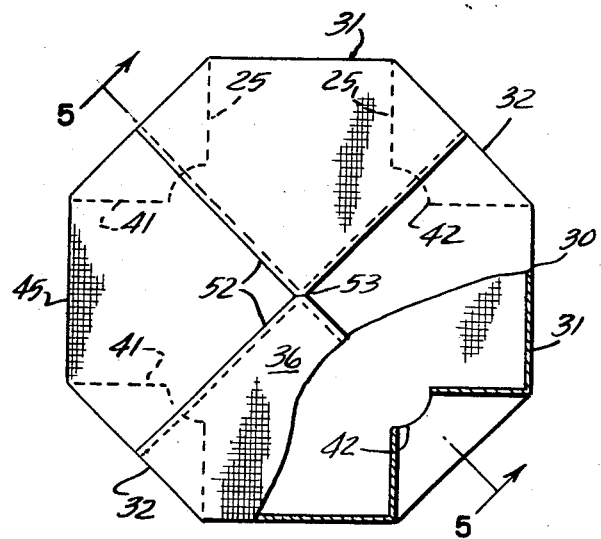

FOLDABLE MINNOW TRAP

This invention relates to a fish or minnow trap and more particularly to a trap that is preferably made from a single flexible sheet of resilient material that is precut, folded and so provided with joined edge portions as to be manipulatable by a fisherman into a self-sustaining operational trap structure suitable for its intended use.

Prior art minnow traps have a chamber through which there is a free flow of water and the inlet of the chamber is usually provided by a truncated conically shaped structural portion which is so arranged that the actual inlet opening is inwardly offset from the overall perimeter of the outer wall of the chamber defining structure. The conically shaped structure provides an entranceway or corridor which gradually diminishes in size as it converges on the chamber inlet opening so that minnows entering the entranceway are gradually guided by the structure toward a small inlet opening to the chamber. From within the chamber, the conical structure obscures the location of the inlet and tends to guide the trapped minnows toward the peripheral portions of the trap walls and consequently the arrangement diminishes the probabilities that the fish will thereafter find its way back to the inlet for an escape route.

Attempts have been made in the past to embody these structural features in minnow traps which can be collapsed into compact structures for handling and storage purposes. Such prior art attempts however, have suffered from one or more disadvantages that detract from their manufacture and/or their actual use by the sportsman. For one, the traps must retain a suitable operational shape in order to carry out their intended function. This requirement has led manufacturers into the use of rigid components for the needed support in the operational trap. In some cases the rigid components are provided with telescoping, pivotal or other features that lead to compactness upon collapse of the operational trap. In the main, however, such structures limit the size and shape of the collapsed trap arrangement and in most prior art situations, the rigid components are so bulky as to preclude convenient storage of the collapsed trap, as for example, in the usual tacklebox that forms a part of the gear of the common fishing enthusiast. This is objectionable to the sportsman, and insofar as the manufacturer is concerned, the need for using rigid structures in the manufacture of collapsible traps, requires the embodiment of complicated and expensive design features in the finished article that are expensive from a material and labor cost viewpoint.

A general object of the invention is to provide an improved collapsible minnow trap structure. Yet another object of the invention is to provide a readily portable fish or minnow trap and which may be folded or rolled for easy storage. A further object of the invention is to provide a collapsible minnow trap which can be made from low cost materials and is relatively inexpensive to manufacture and distribute. Yet another object of the invention is to provide a collapsible fish or minnow trap which is made of material that may be folded or rolled in to compact storage and/or shipping arrangement but which is nevertheless capable of adaptation by the sportsman into a self-sustaining operational trap structure capable of serving its intended function.

In the described embodiment of the invention the chamber defining structure of the trap is formed from a water pervious flexible sheet of resilient material which is cut and assembled in a collapsed structural arrangement that enables the sportsman, by simple finger manipulation of the structure, to provide a self-sustaining operational trap structure which avoids the need for rigid components to retain its shape during use. The water pervious sheet of material may be a net-like sheet with meshes that provide the water permeability or may be a suitable continuous sheet of material that has been suitably perforated to provide free flow of water through the operational structure. With the net-like sheets a woven structure may be used or alternatively the woof and warp filaments may be arranged in layers that simply cross and are adhered together at the junctures.

In the collapsed structural arrangement, the trap may comprise a pair of flexible sheet items which are arranged so that one overlies the other in a flat arrangement and which are secured together along their edge portions and provided with an apertured corner in the structural arrangement. In practice however, the trap is preferably made from a single sheet item. Under such circumstances, the single sheet is folded upon itself and the edge portions secured together in an arrangement providing a generally flat two layer structure in which the layers are joined together along the perimeter of the flat structure. The sheet is preferably precut so that the flat two layer structure has at least one apertured corner that ultimately forms a more or less truncated conical entranceway that leads to the inlet of the trap chamber in the operational form of the trap. Alternatively, however, a corner portion of the two layer structure may be removed to provide the aperture when precutting is less desirable. In the formation of the two layer flat structure, the edge portions of the sheet are appropriately secured together. This can be accomplished by means of a suitable adhesive material and when synthetic thermoplastic material is involved by heat sealing techniques. Alternatively, the edge portions may be secured together as by suitable stitching material.

The collapsed two layer flat structural shape of the trap should be such as to provide at least one apertured corner that can be tucked inwardly to provide a generally truncated conically shaped entranceway as will be more fully understood hereinafter. In this respect, a generally triangular two layer flat structural shape may be used or for that matter, a generally oval shaped structural arrangement that provides an appropriate apertured corner for the entranceway.

In the preferred form, the generally flat two layer structure is rectangular in shape and is provided with apertures at each of its four corners so as to provide an adequate number of inlet openings to the chamber area of the operational trap. The flat structure, of course, can be easily folded or rolled for storage and handling purposes.

In the formation of the minnow trap from the two layer structure, as will be subsequently seen, the fisherman by finger manipulation of the material merely tucks the corner portions inwardly between the layers so as to provide a creased side wall structure with the entranceway formed by each corner portion serving to sustain the top and bottom walls of the trap in spaced relation. The flexible sheet is made of resilient material capable of recovering its shape after deformation and in the overall operational form of the trap, the resiliency of the material and creased arrangement impart self-sustaining characteristics enabling the operational form to withstand the normal environmental conditions that prevail during use of the device without collapsing.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 3 is an elevational section view taken generally along the lines 3–3 of FIG. 2.

FIG. 3a is an enlarged fragmentary view showing the details of the netting material generally along the lines 3a–3a of FIG. 2.

FIG. 4 is a top view of the trap after the corners of the two layer structure seen in FIGS. 2 and 3 have been tucked in to form the entranceways of the operational trap with certain parts broken away, and FIG. 5 is a vertical section of the operational trap as generally seen along the lines 5–5 of FIG. 4.

Figure 1:
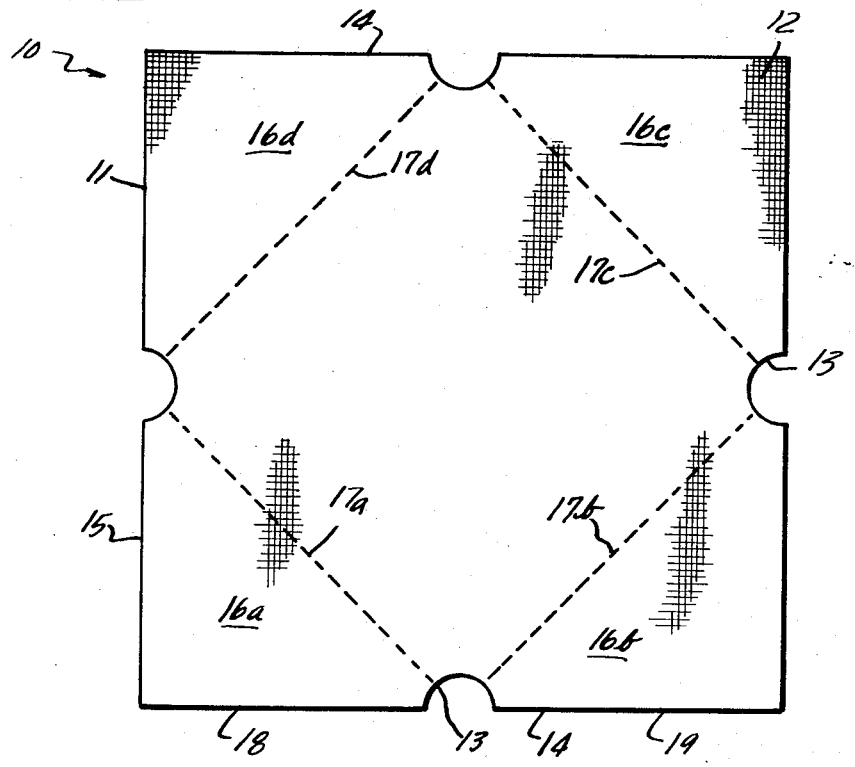
FIG. 1 is a plan view of a flexible sheet made from woven filaments of synthetic plastic material, the sheet being precut to ultimately provide apertured corners in the two layer collapsed structural form of the trap.

Reference is now made to the drawings and more particularly to FIG. 1 where a blank used in forming the collapsible trap structure is designated at 10. The blank in the embodiment illustrated consists of a square shape net-like sheet 11 of woven filaments 12 made from synthetic plastic material and is precut to provide notches 13 in each of the opposite edges 14 and 15 of the sheet 11. These notches 13, seen in FIG. 1, are located intermediate the corners of the square sheet in the illustrated embodiment and ultimately provide the inlets to the chamber in the operational trap structure.

Figure 2:
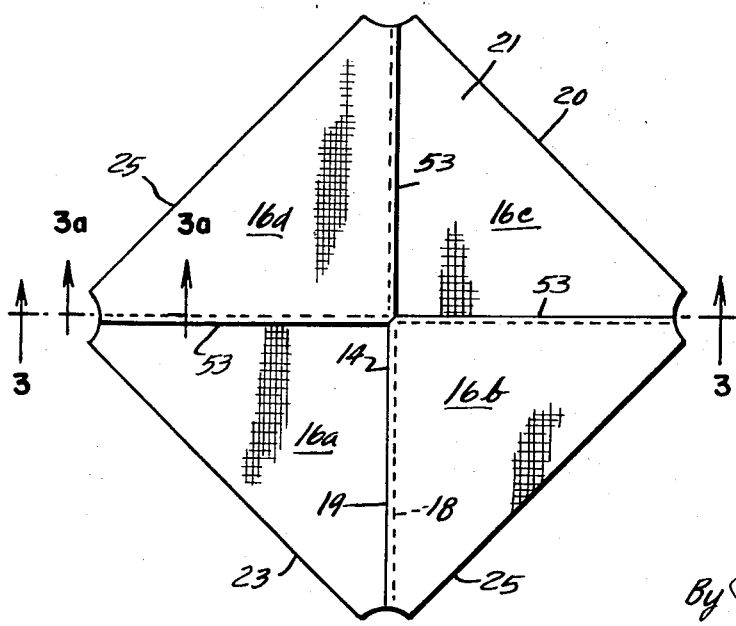
FIG. 2 shows a plan view of the collapsed trap structure after the edge portions of the sheet shown in FIG. 1 have been appropriately secured together to provide a two layer arrangement.

In manufacturing the preferred embodiment of the invention which is illustrated, the sheet 11 is folded upon itself to provide a generally flat two layer structure 20 that is shown in FIGS. 2 and 3. To accomplish this, the four corner portions 16a, 16b, 16c and 16d of the sheet 11 are folded, as along the broken lines designated at 17a, 17b, 17c and 17d, so that the opposite edge portions of each of the opposite edges 14 and 15 overlap. The overlapping arrangement is illustrated in FIG. 2 by reference to opposite edge portions 18 and 19 of the lowermost of the opposite edges 14 seen in FIG. 1. These edge portions are then secured together in the illustrated embodiment by a suitable adhesive although other techniques may be used as indicated above. This provides seams which are designated at 53.

The generally flat tow layer collapsed trap structure formed after the edge portions of sheet 11 are secured together is shown in FIGS. 2 and 3. The upper layer or top portion 21 of the folded sheet 11 in the arrangement is formed by the corner portions 16a through 16d inclusive and, in the arrangement, this top sheet portion 21 facially confronts the lower layer or bottom forming portion 22 of the sheet that is generally defined by the lines 17a through 17d inclusive in FIG. 1. In the generally flat two layer collapsed structure 20, the upper and lower layers 21 and 22 each assume a substantially planar arrangement and are joined along the folds 23 around the perimeter of the structure 20. The cutouts 13 serve to equip each of the corners portions 25 in the collapsed structural arrangement with an aperture that provides an inlet opening in the operational form of the trap.

The structure shown in FIGS. 2 and 3 illustrates the trap in its collapsed state and by virtue of the flexible nature of the sheet, the structure may be randomly folded and/or rolled up to provide a compact arrangement for storage purposes as will be obvious.

To form an operational minnow trap such as designated at 30 in FIGS. 4 and 5 from the flat two layer structure 20 seen in FIGS. 2 and 3, the top and bottom layers 21 and 22 of structure 20 are drawn apart by finger manipulation of the structure 20 and the corner portions 25 are tucked inwardly to provide generally truncated conically shaped portions in the side wall 31 of the operational trap structure. As the corners 25 are tucked in by the fisherman, a generally circular crease 32 is formed in the top and bottom sheet portions 21 and 22 and this coupled with the resiliency of the material serves to provide the structural rigidity that is needed in the side wall 31 of the operational trap in order for this wall 31 to wholly sustain the top and bottom trap walls, 36 and 37, respectively, in spaced relation and thus provide a self-sustaining structure which will maintain its shape without the need for additional rigid components.

It should be noted that the walls of operational trap structure 30, are wholly formed from the bottom and top structural portions 21 and 22 of the collapsed trap structure 20 and that the chamber area 40 in which the minnows are trapped is wholly defined by the top and bottom sheet portions 21 and 22. It should also be noted that the truncated conically shaped portions of the side wall 31 that are formed from the tucked in corner portions 25 are located between the top and bottom walls 36 and 37 in the operational trap 30. With this arrangement the truncated portion 41 provided by the tucked in corners 25 serve as entranceways to the chamber 40 and define inlet openings 42 that are inwardly offset from the peripheral areas 45 of the side wall 31.

To use the trap 30, the fisherman needs only to insert a suitable bait in the chamber area 40 and to lower the trap 30 into the water. In this respect, provisions can be made to recover the trap 30 by simply tying a spare piece of fish line to the top wall 36 of the trap 30, the attachment being preferably made centrally of the top wall 36 as at the junction 53 of the edge portion of seams 52 shown in FIGS. 4 and 5.

The material of which the sheet is made should be flexible and have a density greater than water to be assured that the trap will sink and should also have sufficient resiliency to recover its shape and take on the generally flat two layer structure in the collapsed structural form provided when the apertured corners are withdrawn from between the upper and lower walls of the operational trap. Filaments made from synthetic resin coated fiberglass which have a 16 mil diameter and are woven into 14—14 mesh net-like sheets have been found to be entirely satisfactory for use in making the trap. Filaments made from other materials may also be used, typical of which may be mentioned are polyethylene, polypropylene and nylon filaments and if need be, the materials may be pigmented to impart greater density factors. Perforated sheets of suitable flexible and resilient material may also be used and in this respect, perforated sheets of vinyl material with about a 20 mil thickness are appropriate.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A collapsible minnow trap having a flat, flexible structure which constitutes a collapsed form of the trap, and which may be randomly folded or rolled for the compact storage thereof, said flat, flexible structure essentially consisting of a flat, substantially planar, water pervious, flexible bottom structural portion, and a flat, substantially planar, water pervious, flexible top structural portion that overlies and is joined to said bottom structural portion around the perimeter of the flat, flexible structure, said bottom and said top structural portions being resiliently deformable and being creasable by finger manipulation to provide an operational form of minnow trap which has a chamber for trapped minnows that is wholly defined by said bottom and top structural portions, said flexible structure comprising a corner portion having an aperture that provides an inlet opening to the chamber in the operational form of the trap, said operational form of the minnow trap including walls which are wholly formed from said bottom and top structural portions of said flexible structure, and which essentially consist of a creased side wall having a generally truncated conically shaped portion which defines an entranceway communicating with said chamber through said inlet opening, and top and bottom walls which are spaced apart and wholly sustained in their spaced relation by said creased side wall, said truncated conically shaped portion being located between said top and bottom walls in said operational form of the trap, and being formed from said corner portion of said flexible structure.

2. A collapsible minnow trap having a flat, flexible, generally rectangular structure which constitutes a collapsed form of the trap, and which may be randomly folded or rolled for the compact storage thereof, said flat, flexible structure essentially consisting of a flat, substantially planar, water pervious, flexible bottom structural portion, and a flat, substantially planar, water pervious, flexible top structural portion that overlies and is joined to said bottom structural portion around the perimeter of the flat, flexible structure, said bottom and said top structural portions being made from resiliently deformable net-type sheet material and being creasable by finger manipulation to provide an operational form of minnow trap which has a chamber for trapped minnows that is wholly defined by said bottom and top structural portions, said flexible, generally rectangular structure comprising corner portions having respective apertures that provide inlet openings to the chamber in the operational form of the trap, said operational form of the trap including walls which are wholly formed from said bottom and top structural portions of said flexible structure, and which essentially consist of a creased side wall having at least one generally truncated conically shaped portion which defines an entranceway communicating with said chamber through one of said inlet openings, and top and bottom walls which are spaced apart and wholly sustained in their spaced relation by said creased side wall, said truncated conically shaped portion being located between said top and bottom walls in said operational form of the trap, and being formed from said corner portion of said flexible structure.

* * * * *